UNITED STATES PATENT OFFICE.

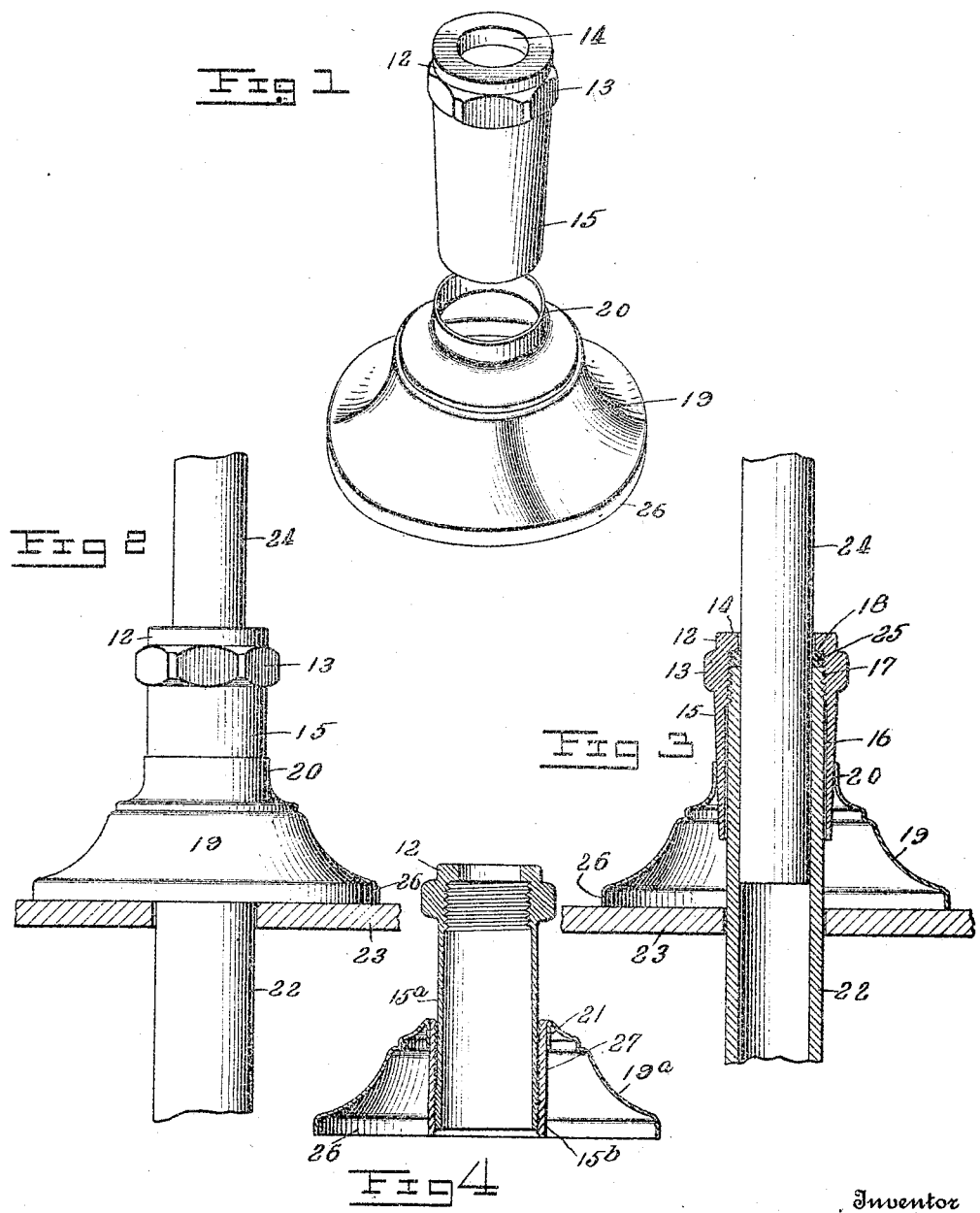

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

ADJUSTABLE SLEEVE-NUT AND FLANGE.

999,332.          Specification of Letters Patent.    Patented Aug. 1, 1911.

Application filed March 28, 1911. Serial No. 617,513.

*To all whom it may concern:*

Be it known that I, PHILIP MUELLER, a citizen of the United States, residing at Decatur, in the county of Macon and State of Illinois, have invented new and useful Improvements in Adjustable Sleeve-Nuts and Flanges, of which the following is a specification.

My present invention relates to an improved slip-joint coupling nut and flange especially designed for use in the plumbing art and particularly adapted for association with the unfinished iron service-pipes that supply water to the finished supply pipes and to which supply-pipes the cocks or faucets of lavatory receptacles are coupled.

As is well understood in the plumbing art, the so-called service pipes are usually of unpolished or unfinished iron, and in practice they project more or less through the floor or wall of the bath-room or other apartment in which the bath-tub, basin or other receptacle to be supplied with water, is located, and these unpolished or unfinished pipe ends if left exposed are very unsightly and detract materially from the general appearance of the finished job, especially where the supply-pipes leading from the service pipes are nickeled or otherwise finished, as is the usual custom at the present time when the "open" style of plumbing is installed.

The prime object of the present invention is to provide an improved finished or polished coupling nut for connecting two telescoping pipes, as for instance a service-pipe with its associated supply-pipe, said nut being provided with an integral sleeve-like extension adapted to cover the exposed projecting end of the service-pipe and also having associated therewith a finishing flange which is slidably and adjustably mounted upon the said sleeve-like extension of the nut and adapted to make contact at its marginal edges with the floor, wall or ceiling through which the service pipe extends, thus completely covering not only the service pipe but also the opening in the floor, wall or ceiling through which it passes, with the result that all the exposed pipes and their connections are finished and a neat and ornamental job secured throughout.

In order that my improvements may be clearly understood and carried into practice, I will proceed to describe the same in connection with the accompanying drawing wherein—

Figure 1, is a perspective view of a coupling nut and flange made according to the invention, the parts being separated. Fig. 2, is an elevation of the nut and flange shown as applied in use. Fig. 3, is a longitudinal section of the parts illustrated in Fig. 2, and Fig. 4, is sectional view of a slightly different construction of flange and nut.

Referring to the drawing the reference numeral 12, designates a nut having the usual wrench-gripping faces 13, said nut having a contracted smooth walled opening 14 in one end and provided at its opposite end with a relatively long and slightly tapering sleeve-like extension 15, which has a smooth bore 16, for a portion of its length; internal threads 17, for another portion of its length, and an internal annular shoulder 18, at the extremity of the threaded portion adjacent the smooth wall of the opening 14. As shown in the drawing, the diameter of the opening 14, is less than the diameter of the threaded portion 17, and the diameter of the bore 16, is greater than the threaded portion 17, all for a purpose presently to appear.

Associated with and adapted to slidably and adjustably engage the smooth exterior of the tapering sleeve-like extension 15, of the nut, is a box flange 19, having a contracted neck-portion, which may extend outward from the body of the flange as shown at 20, Figs. 1, 2 and 3, or which may be inturned as shown at 21, Fig. 4. The contracted neck 20, or 21, of the flange 19, is somewhat yielding, owing to the fact that it is made of thin sheet metal, and consequently it will closely hug or embrace the sleeve-like extension 15, and furthermore, owing to the fact that the said extension tapers slightly, the contracted : will the more closely embrace the neck the farther the neck is projected thereinto, thus a firm frictional engagement may be made between the parts such as will hold them closely and tightly together.

In Figs. 2 and 3, I have illustrated one use to which my improved coupling-nut and flange may be put, the illustrations representing these parts as applied to a service and a supply-pipe. In these said figures the reference numeral 22, designates the end of an ordinary unfinished iron service-pipe shown as projecting through a floor 23, and the numeral 24, designates a polished or nickled supply-pipe which has an adjustable telescopic connection with the service-pipe. It will be seen that the nut 12, is screwed upon the threaded end of the service-pipe 22, a packing washer 25, being interposed between the end of the pipe and the internal annular shoulder 18, of the nut in order to effect a tight joint around the telescoping end of the supply-pipe. The relatively long sleeve-like extension 15, extends down over the exposed end of the service-pipe to completely cover the same, while the flange 19, may be adjusted upon the extension in a manner to bring its lower edge 26 into contact with the floor or wall surface 23, whereby not only to cover any portion of the service-pipe that may have been left exposed, but to cover and conceal the opening in the floor, wall or ceiling through which the service-pipe extends.

In the construction illustrated in Fig. 4, the sleeve portion 15$^a$ of the nut 12, is exteriorly screw-threaded at its lower end as shown at 15$^b$ upon which screw-threaded portion the flange 19$^a$ may be adjusted, the flange in this instance being provided with an interiorly threaded ring or collar 27, which is preferably sweated or otherwise secured to the inturned neck 21 of the flange 19$^a$. As will be seen the ring or collar 27, is internally threaded throughout its entire length, while the sleeve portion 15$^a$ is externally threaded for only a portion of its length, and this at its lower end, so that a considerable adjustment of the sleeve nut relatively to the box-flange may be had without exposing the said threaded portion 15$^b$.

While I have herein illustrated and described a preferred embodiment of my invention, I do not wish to be understood as limiting myself to the specific construction and arrangement of parts shown, except as I may be limited by the terms of the appended claims, as it will be obvious to those skilled in the art that slight changes or additions may be made without departing from the spirit of the invention.

What I claim is:—

1. As a new article of manufacture, a slip joint coupling nut having a sleeve-like extension combined with an associated flange having a flaring base portion a contracted neck adapted to adjustably embrace said extension.

2. A fitting of the character described comprising a slip joint coupling nut having a tapering sleeve-like extension, combined with a flange provided with a contracted neck adapted to adjustably embrace said extension and a flaring base portion having an annular rim.

3. A fitting of the character described comprising a slip joint coupling nut provided with a relatively long sleeve-like extension having a smooth bore for a portion of its length and internally threaded for another portion, combined with a flange provided with a contracted neck adjustably embracing said extension and said flange having an enlarged base.

4. A fitting of the character described, comprising an internally threaded slip joint coupling nut provided with a relatively small opening in one end and a sleeve-like extension having a smooth bore for a portion of its length, the diameter of said bore being greater than the diameter of the threaded portion of the nut.

5. A fitting of the character described, comprising an internally threaded slip joint coupling nut provided with a relatively small opening in one end and a sleeve-like extension at the opposite end having a smooth bore for a portion of its length, the diameter of the bore being greater than the diameter of the threaded portion of the nut, combined with a flange having a contracted neck adapted to adjustably embrace said extension, said flange being cupped and having an annular rim at the base thereof.

6. A fitting of the character described comprising a slip joint coupling nut having a sleeve-like extension exteriorly threaded at its lower end and internally threaded near its upper end, combined with a box-flange associated with and having a threaded neck in threaded engagement with the sleeve.

In testimony whereof I have hereunto set my hand in presence of two subscribing witnesses.

PHILIP MUELLER.

Witnesses:
LEONARD F. MCKIBBEN,
WILLIAM R. BIDDLE.